United States Patent
Bhandari et al.

(10) Patent No.: US 10,078,112 B2
(45) Date of Patent: *Sep. 18, 2018

(54) SECURITY SYSTEM AND METHODS FOR INTEGRATED DEVICES

(71) Applicant: mCube Inc., San Jose, CA (US)

(72) Inventors: Sanjay Bhandari, San Jose, CA (US); Tony Maraldo, San Jose, CA (US)

(73) Assignee: mCube, Inc., San Jose, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 15/236,182

(22) Filed: Aug. 12, 2016

(65) Prior Publication Data

US 2016/0349327 A1 Dec. 1, 2016

Related U.S. Application Data

(63) Continuation of application No. 13/762,237, filed on Feb. 7, 2013, now Pat. No. 9,418,247.

(60) Provisional application No. 61/596,192, filed on Feb. 7, 2012.

(51) Int. Cl.
*G06F 21/00* (2013.01)
*G01R 31/317* (2006.01)
*G01R 31/3177* (2006.01)
*G06F 21/73* (2013.01)

(52) U.S. Cl.
CPC ... *G01R 31/31719* (2013.01); *G01R 31/3177* (2013.01); *G01R 31/31701* (2013.01); *G06F 21/73* (2013.01)

(58) Field of Classification Search
CPC ....................................................... G06F 21/73
See application file for complete search history.

(56) References Cited

U.S. PATENT DOCUMENTS 6,249,893 B1 6/2001 Rajsuman et al.
7,810,152 B2 10/2010 Carr
9,418,247 B2 8/2016 Bhandari et al.
(Continued)

OTHER PUBLICATIONS

Tremblay et al., "VIC Speeds New Media Processing", Aug. 1996, IEEE.*

*Primary Examiner* — John B King
(74) *Attorney, Agent, or Firm* — Kilpatrick Townsend & Stockton LLP

(57) ABSTRACT

A method is provided for implementing a security mechanism in an integrated MEMS (Micro-Electro-Mechanical-System) device having a MEMS sensor with an output register associated with a sensing operation, the integrated MEMS device being electrically coupled to a computing system programmed to perform the method. The method includes, in normal operation, reading from the output register an output of the sensing operation, and in a test mode, determining, by a processor disposed within the computing system, a random value. Determining the random value can include reading from the output register, which in the test mode or provides a value from an internal pattern generator. The method also includes determining, by the processor, a validation value, reading, by the processor, the random value stored in the output register; and determining, by the processor, whether the integrated device is valid using the validation value and the random value stored in the output register.

27 Claims, 5 Drawing Sheets

(56) References Cited

U.S. PATENT DOCUMENTS

| | | | |
|---|---|---|---|
| 2003/0210786 A1* | 11/2003 | Carr | G11C 16/22 |
| | | | 380/241 |
| 2009/0125720 A1 | 5/2009 | Walmsley | |
| 2010/0070777 A1* | 3/2010 | Salters | G11C 7/24 |
| | | | 713/189 |
| 2010/0223453 A1 | 9/2010 | Walmsley | |
| 2011/0161678 A1* | 6/2011 | Niwa | G06F 12/1408 |
| | | | 713/193 |
| 2013/0058495 A1* | 3/2013 | Furst | H03K 19/017509 |
| | | | 381/80 |
| 2014/0108786 A1* | 4/2014 | Kreft | G06F 21/71 |
| | | | 713/156 |

* cited by examiner

SECURITY SYSTEM AND METHODS FOR INTEGRATED DEVICES

CROSS-REFERENCES TO RELATED APPLICATIONS

The present application is a continuation-in-part (CIP) application of U.S. patent application Ser. No. 13/762,237, filed Feb. 7, 2013, which claims priority to and incorporates by reference, for all purposes, the following patent application: U.S. Provisional Pat. App. No. 61/596,192, filed Feb. 7, 2012.

BACKGROUND OF THE INVENTION

The present invention is directed to applications of integrated circuit (IC) and MEMS (Micro-Electro-Mechanical-Systems) devices. More specifically, embodiments of the invention provide systems and methods for implementing security mechanisms in integrated devices and related structures, which can be implemented in mobile phones, tablets, hand-held computers, and the like. But it will be recognized that the invention has a much broader range of applicability.

Research and development in integrated microelectronics have continued to produce astounding progress in CMOS and MEMS. CMOS technology has become the predominant fabrication technology for integrated circuits (IC). MEMS, however, continues to rely upon conventional process technologies. In layman's terms, microelectronic ICs are the "brains" of an integrated device which provides decision-making capabilities, whereas MEMS are the "eyes" and "arms" that provide the ability to sense and control the environment. Some examples of the widespread application of these technologies are the switches in radio frequency (RF) antenna systems, such as those in the iPhone™ device by Apple, Inc. of Cupertino, Calif., and the Blackberry™ phone by Research In Motion Limited of Waterloo, Ontario, Canada, and accelerometers in sensor-equipped game devices, such as those in the Wii™ controller manufactured by Nintendo Company Limited of Japan. Though they are not always easily identifiable, these technologies are becoming ever more prevalent in society every day.

Beyond consumer electronics, use of IC and MEMS has limitless applications through modular measurement devices such as accelerometers, gyroscopes, actuators, and sensors. In conventional vehicles, accelerometers and gyroscopes are used to deploy airbags and trigger dynamic stability control functions, respectively. MEMS gyroscopes can also be used for image stabilization systems in video and still cameras, and automatic steering systems in airplanes and torpedoes. Biological MEMS (Bio-MEMS) implement biosensors and chemical sensors for Lab-On-Chip applications, which integrate one or more laboratory functions on a single millimeter-sized chip only. Other applications include Internet and telephone networks, security and financial applications, and health care and medical systems. As described previously, ICs and MEMS can be used to practically engage in various type of environmental interaction.

Although highly successful, ICs and in particular MEMS still have limitations. Similar to IC development, MEMS development, which focuses on increasing performance, reducing size, and decreasing cost, continues to be challenging. Additionally, applications of MEMS often require increasingly complex microsystems that desire greater computational power. Unfortunately, such applications generally do not exist. These and other limitations of conventional MEMS and ICs may be further described throughout the present specification and more particularly below.

From the above, it is seen that techniques for improving operation of integrated circuit devices and MEMS are highly desired.

BRIEF SUMMARY OF THE INVENTION

The present invention is directed to applications of integrated circuit (IC) and MEMS (Micro-Electro-Mechanical-Systems) devices. More specifically, embodiments of the invention provide systems and methods for implementing security mechanisms in integrated devices and related structures, which can be implemented in mobile phones, tablets, hand-held computers, and the like. These integrated devices can include IC, MEMS, IC-MEMS, and other devices and combinations thereof. Merely by way of example, the MEMS devices can include at least an accelerometer, a gyroscope, a magnetic sensor, a pressure sensor, a microphone, a humidity sensor, a temperature sensor, a chemical sensor, a biosensor, an inertial sensor, and others. But it will be recognized that the invention has a much broader range of applicability.

In an embodiment, the present invention provides a micro-processor, on-chip logic, or software implemented method for implementing a security mechanism in an integrated device electrically coupled to a computing system programmed to perform the method. This method can include validating a device ID, generating a random value based on selected seed parameters, performing logic operations from hardware using the random value, and validating the integrated device based on logic operations from software using the random value.

Many benefits are achieved by the way of the present invention over conventional techniques. Various embodiments of the present invention represent several implementations of a security mechanism for integrated devices. These implementations provide several levels of encryption or protection of integrated devices, which can be tailored depending on the hardware and/or software requirements of specific applications.

Various additional objects, features and advantages of the present invention can be more fully appreciated with reference to the detailed description and accompanying drawings that follow.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

The present invention is directed to applications of integrated circuit (IC) and MEMS (Micro-Electro-Mechanical-Systems) devices. More specifically, embodiments of the invention provide systems and methods for implementing security mechanisms in integrated devices and related structures, which can be implemented in mobile phones, tablets, hand-held computers, and the like. These integrated devices can include IC, MEMS, IC-MEMS, and other devices and combinations thereof. Merely by way of example, the MEMS devices can include at least one of an accelerometer, a gyroscope, a magnetic sensor, a pressure sensor, a microphone, a humidity sensor, a temperature sensor, a chemical sensor, a biosensor, an inertial sensor, and others. But it will be recognized that the invention has a much broader range of applicability.

Figure 1:
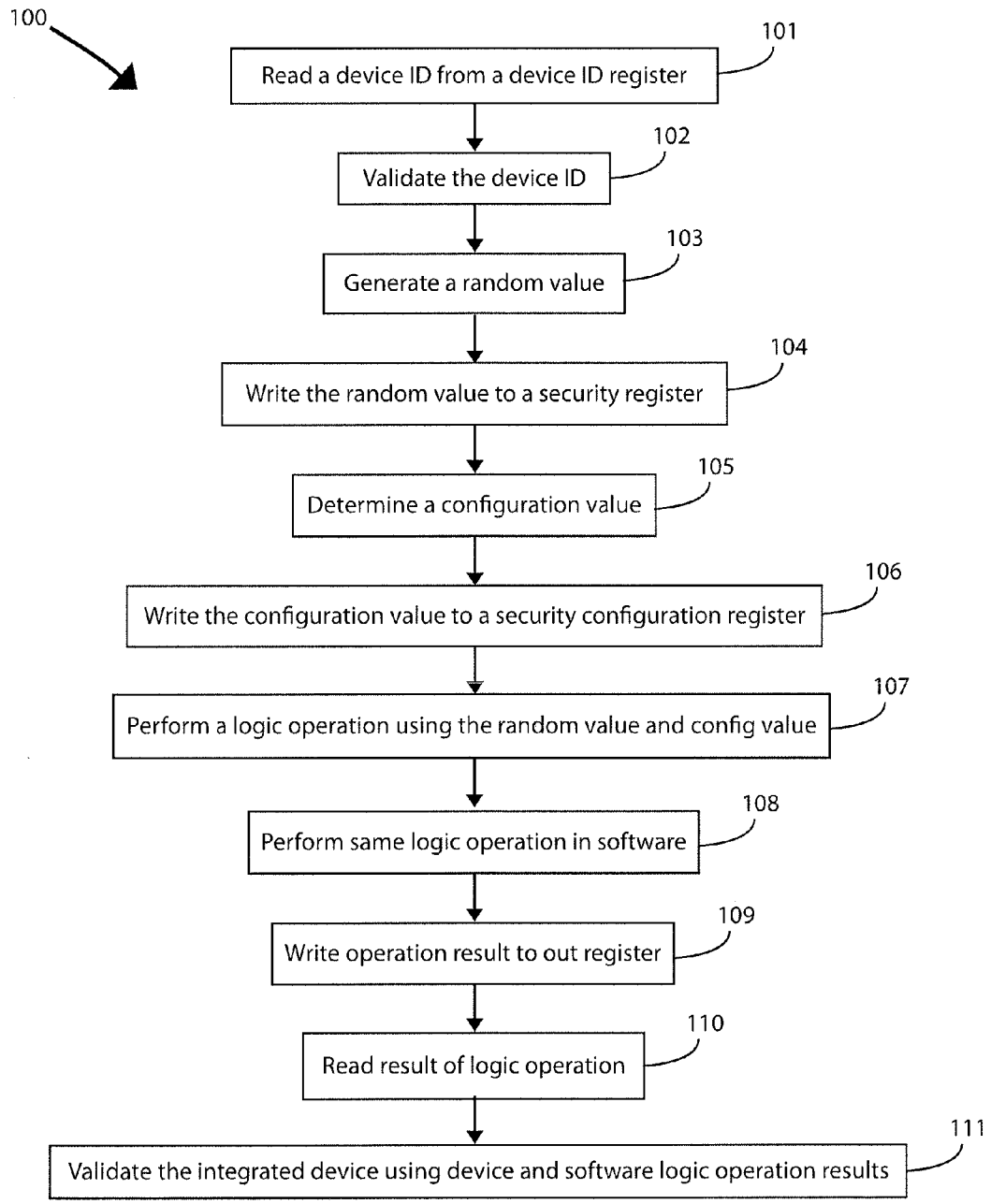
FIG. 1 is a simplified flow diagram of a method for implementing a security mechanism in an integrated device according to an embodiment of the present invention.

FIG. 1 is a simplified flow diagram of a method for implementing a security mechanism in an integrated device according to an embodiment of the present invention. In an embodiment, the present invention provides a micro-processor, on-chip logic, or software implemented method for implementing a security mechanism in an integrated device electrically coupled to a computing system programmed to perform the method. As shown, the method 100 can include the following steps:

101. reading, by a processor disposed within the computing system, a device ID from a device ID register disposed within the integrated device;
102. determining, by the processor, whether the device ID of the integrated device is valid;
103. determining, by the processer, a random value;
104. writing, by the processor, the random value to a security register disposed within the integrated device;
105. determining, by the processor, a configuration value;
106. writing, by the processor, the configuration value to a security configuration register disposed within the integrated device;
107. determining, by a logic module disposed within the integrated device, an operation result via a logic operation using the random value and the configuration value;
108. writing, by the processor, the operation result to the security register;
109. determining, by the processor, a validation result using the logic operation;
110. reading, by the processor, the operation result from the security register; and
111. determining, by the processor, whether the integrated device is valid using the validation result and the operation result.

These steps are merely examples and should not unduly limit the scope of the claims herein. As shown, the above method provides a security mechanism implementation for integrated devices according to an embodiment of the present invention. One of ordinary skill in the art would recognize many other variations, modifications, and alternatives. For example, various steps outlined above may be added, removed, modified, rearranged, repeated, and/or overlapped, as contemplated within the scope of the invention.

In an embodiment, every device (IC) has a hard-coded device ID in an OTP register. For example, several bytes in an OTP register can be configured for dedicated, differentiated device ID as needed. In a specific embodiment, the random value can include an 8-bit random value. The random value can be determined via a time stamping, gain, offset logic, or use other registers to generate one or more seeds for the random number generation. The random number generated by software may be implemented as dependency on 'version/build number' of the software specific to the type of functionality and device ID of the devices it will work with. These can be incorporated as 'seeds' of random numbers or the number itself.

In a specific embodiment, the security configuration register can include the device ID register. The logic module can include a XOR (exclusive OR) logic module coupled to the security register and the logic operation can include an XOR operation. Further details of this simple logic implementation are provided below in the description for FIG. 2.

In a specific embodiment, the logic module can include a linear feedback shift register (LFSR) module coupled to the security register. Here, the logic operation can include an LFSR operation performed in a loop for k times, where k is an integer greater than or equal to 1. In this case, reading the operation result from the security register can include first waiting k clock cycles for these operations to finish before reading the final value. Also, the configuration value used with the LFSR embodiment can include various polynomials that can be loaded into the security configuration register. Further details of this LFSR implementation are provided below in the description for FIG. 3.

Figure 2:
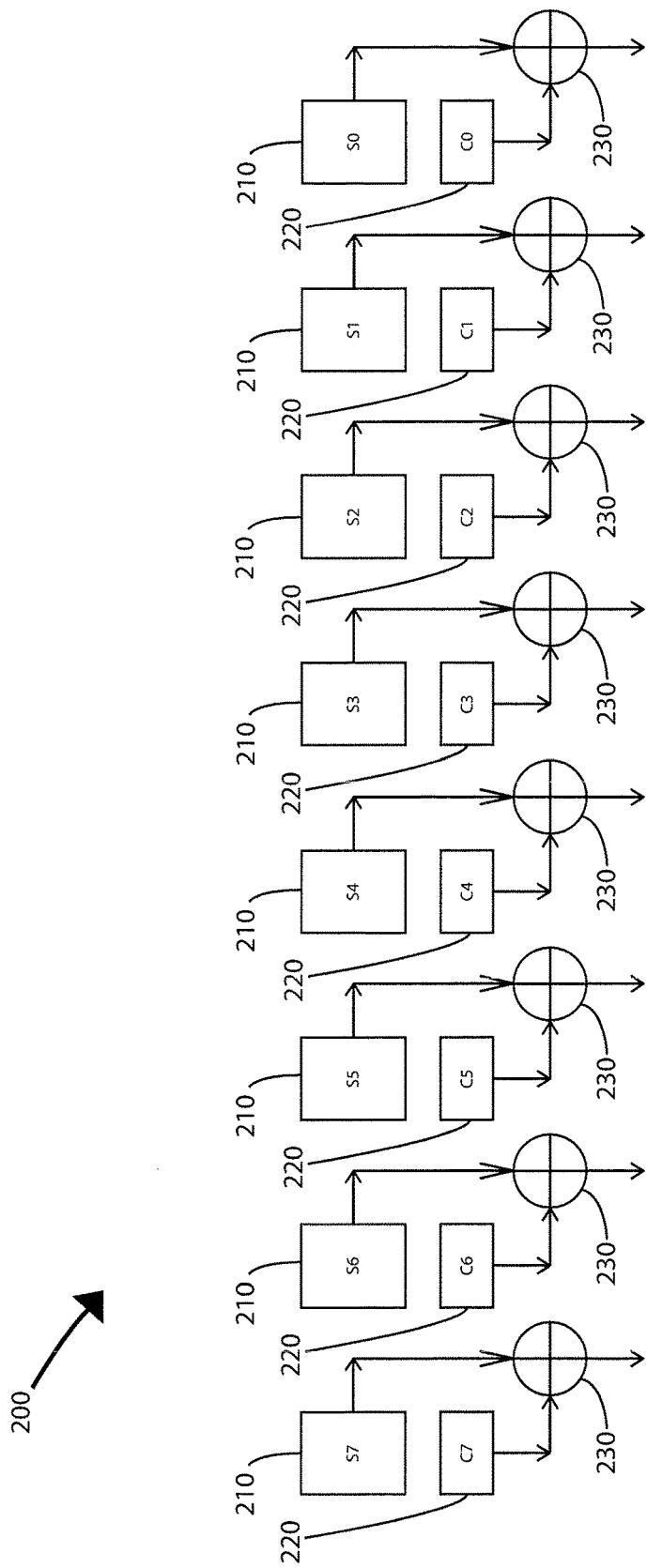
FIG. 2 is a simplified block diagram of a register according to an embodiment of the present invention.

FIG. 2 is a simplified block diagram of a register according to an embodiment of the present invention. As shown, register 200 includes security register bits 210, security configuration bits 220, and logic gates 230. In a specific embodiment, this register 200 can represent a simple logic implementation of a security mechanism for integrated devices. The logic gates 230 can be XOR gates. The XOR of the 'config register' or security configuration register may be selected as the 'Device ID register with the 'security register' downloaded by software. The result of the XOR operation can be loaded to a register and read through an I2C bus.

Figure 3:
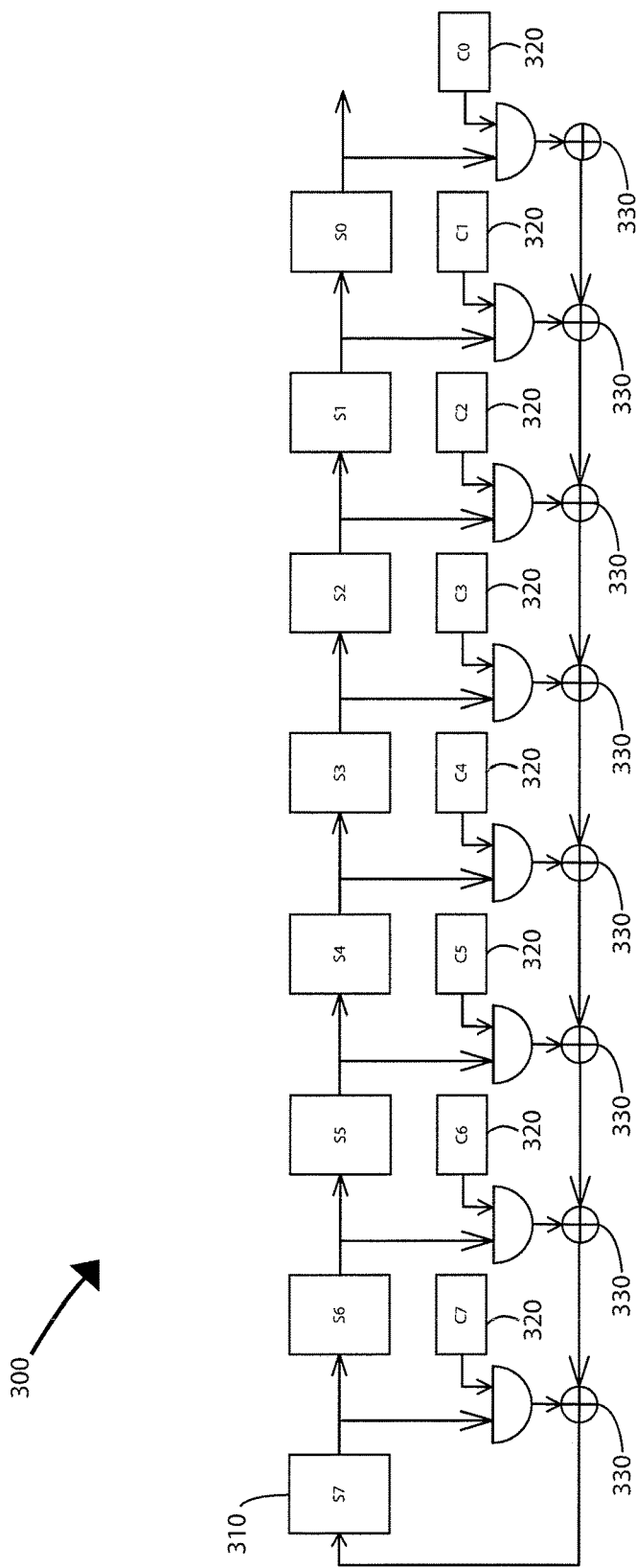
FIG. 3 is a simplified block diagram of a register according to an embodiment of the present invention.

FIG. 3 is a simplified flow diagram of a method for implementing a security mechanism in an integrated device according to an embodiment of the present invention. As shown, register 300 includes shift register bits 310, security configuration bits 320, and logic gates 330. In a specific embodiment, this register 300 can represent an LFSR implementation.

As an example, this implementation can include loading a polynomial choice in to the 'configuration register' or security configuration register (C7.C0). Some polynomial choices are as follows:

$$x^8+x^4+x^3+x^2+1 \qquad \text{Polynomial \#1:}$$

$$x^8+x^6+x^5+x^4+1 \qquad \text{Polynomial \#2:}$$

In a specific embodiment, the 'seed' value is loaded in to the shift register (S7.S0). The number of clock shifts can be made to be programmable by using a counter. After a desired number 'k' clock cycles, the resulting value in the contents of the shift register can be read out from an I2C bus. The programmability of running the LFSR process for 'K' clock cycles allows for additional levels of encryption. This implementation provides a significant number of permutations, using different config register contents to adapt for different versions of software and hardware.

Figure 4:
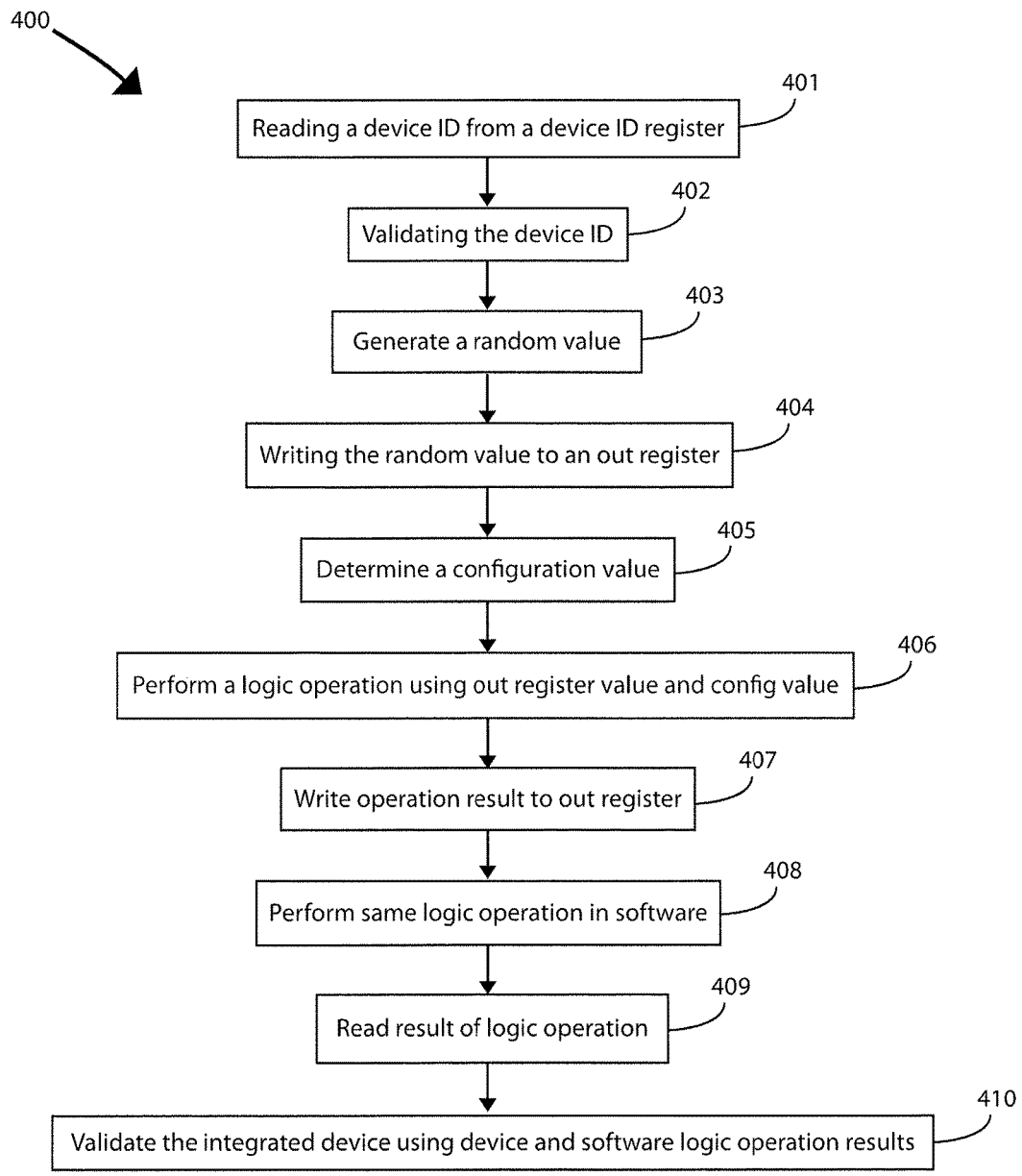
FIG. 4 is a simplified flow diagram of a method for implementing a security mechanism in an integrated device according to an embodiment of the present invention.

FIG. 4 is a simplified flow diagram of a method for implementing a security mechanism in an integrated device according to an embodiment of the present invention. In an embodiment, the present invention provides a micro-processor, on-chip logic, or software implemented method for implementing a security mechanism in an integrated device electrically coupled to a computing system programmed to perform the method. Here, the method can represent a soft LFSR mechanism implementation. As shown, the method 400 can include the following steps:

401. reading, by a processor disposed within the computing system, a device ID from a device ID register disposed within the integrated device;
402. determining, by the processor, whether the device ID of the integrated MEMS device is valid
403. determining, by a processor disposed within the computing system, a random value;
404. writing, by the processor, the random value to an out register disposed within the integrated device;
405. determining, by the processor, a configuration value;
406. determining, by a logic module disposed within the integrated device, an operation result via a logic operation using the value stored in the out register and the configuration value;
407. writing, by the processor, the operation result to the out register;
408. determining, by the processor, a validation value using the logic operation;
409. reading, by the processor, the operation result; and
410. determining, by the processor, whether the integrated device is valid using the validation value and the value stored in the out register.

These steps are merely examples and should not unduly limit the scope of the claims herein. As shown, the above method provides a security mechanism implementation for integrated devices according to an embodiment of the present invention. One of ordinary skill in the art would recognize many other variations, modifications, and alternatives. For example, various steps outlined above may be added, removed, modified, rearranged, repeated, and/or overlapped, as contemplated within the scope of the invention.

In an embodiment, the security mechanism can be made to have an high complexity using this approach. The first four steps can provide a "linear" function and "memory." Using these attributes, a chain of 'software' based LFSR mechanisms can be used to provide additional levels of security.

Similar to the embodiment described above in FIG. 1, every device (IC) has a hard-coded device ID in an OTP register. For example, several bytes in an OTP register can be configured for dedicated, differentiated device ID as needed. In addition to the device ID register, existing registers and test modes can be used to return "digital values" dependent on the "input values" of various MEMS devices, such as accelerometers. Details described above for FIG. 1 can also be applicable here for FIG. 4.

In an a specific embodiment, the logic operation can include a linear transformation from 8-bit to 16-bit space through a Raw Bypass Mode (RBM) operation. This RBM operation can include returning an RBM value. Furthermore, the step of determining the operation result can include determining the operation result via the logic operation using the value stored in the out register and a binary value or a portion or the RBM value.

In a specific embodiment, the following hardware functionality can be used: Writing "1" to ENABLE "TEST_XOUT", or "TEST_YOUT", or "TEST_ZOUT" feature that will provide, XOUT, YOUT, ZOUT values generated by an internal pattern generator with a variable duty cycle. For example, when the TEST_XOUT bit is set, writing to XOUT (register 0X00) sets the duty cycle of the internal pattern generator. A value of 0X00 sets the duty cycle to 0%, 0X80 sets the duty cycle to 50% and 0XFF sets a duty cycle of 100%. Reading XOUT (register 0X00) gives the output of the X axis processing pipeline and a value driven by the pattern generator.

In a specific embodiment, the method can further include enabling, by a test module disposed within the integrated device, a test x-out, y-out, or z-out process. This would result in the step of determining the random value including determining a random x, y, or z-value, respectively. This also would result in the step of writing the random value to an out register including writing the random x, y, or z-value to an x-out, y-out, or z-out register, respectively. A single transaction can provide the least complex security. However, using all three registers X, Y, and Z and making combinations of the values obtained can provide additional levels of a security key.

In a specific embodiment, as a first step of security transaction, the security software will read the device ID and validate it. The software will then generate an 8 bit 'random' number and write to the 'XOUT' register. The 'random' number may use 'time stamping' or any other unique mechanism to generate 'seed.' Next, an 8 bit value from XOUT register or 16 bit value from RBM is read after certain time of conversion. The software will match the read value and compare it with value generated by software (e.g., by the delta sigma modulator, which is a linear function and computable in software). In this embodiment, a single transaction can provide a least complex security. In other embodiments, using all the three registers X, Y, Z and making combination of the values obtained can provide additional level of security key. If desired, gain and offset logic and registers in the accelerometers can also be used for adding seeds or making the computation more complex.

In another embodiment, the above-described method can be extended as a 'software' based LFSR mechanism that can provide additional level of security. The software will determine a 'configuration number (Ns).' Then, the hardware built in to the device will perform a certain "logic" function, e.g., duty cycle to SDM (Sigma-Delta Modulation) output conversion (linear transformation from 8 bits to 16 bit space) through Raw Bypass Mode (RBM), including sign bit. Next, the returned value from the operation is read. In the next time cycle, a combination of the "returned value" from the first cycle is used either as is, or, alternatively, by operating with some coefficients. For example, "0" & "1" can be used as simplest coefficients. However, it is possible to use any other numbers in place of binary numbers. In addition, part of the 16 bit RBM value can also be used. The resultant is "fed back" as seed in the next iteration. If this operation Ns times is performed, it is equivalent of a LFSR mechanism except that instead of using a chain of hardware shift registers, a software loop through "program seed-linear operation-read out" is used which is equivalent to one processing step of one LFSR FlipFlop. Having a multi-bit number (e.g., 8 bit) will make the operation provide additional complexity to the security. In some embodiments, the software will perform same operation in s/w domain. After certain time period ('Ns' cycles as described above), the software will match the hardware results with the result from same operation performed in software. Then the device is validated to work with the accelerometer software version. The random number generated by software may be implemented as dependency on version/build number of the software, time stamp, type of functionality, or device ID of the devices it will work with. These can be incorporated as a seed of random numbers or as the number itself.

In an alternative embodiment, the method can include performing an LFSR process as in conventional hardware for a 'Soft' LFSR scheme. This can follow step of reading the 8-bit value of the operation result. This process can include shifting the operation result left by 1 bit, performing a linear combination as defined by a 'chosen' N bit polynomial, feeding the new 8-bit number back to another iteration of the logic operation, and performing the operation 'm' times, where m is an integer greater than or equal to 1. The higher the value of 'm' chosen, the higher the encryption is provided, but this process also requires more time. This trade-off can be optimized for various applications depending on hardware and software requirements.

In other various embodiments, a simple scheme to implement the 'Soft' LFSR scheme can use the middle two nibbles read from the RBM and feed them back as a seed for the next cycle of the logic operation. A 'maximal length' sequence is not guaranteed in this simple operation, but it is not required since the software performs the same operation for the same number of cycles and is guaranteed to match the hardware logic operation. Also, the complete byte (8 bits) can be treated as an 8-bit wide LFSR output number. Operations by polynomials can be performed on this byte and the time sequenced bytes can be treated similar to a single bit in the simple LFSR scheme.

In a specific embodiment, the present invention also provides a computing system for processing data from an integrated MEMS device electrically coupled to the computing system. This system can include an integrated MEMS device with a MEMS sensor, a logic module, a device ID register, a security register, and a security configuration register. Also include are a tangible memory for storing a plurality of executable instructions, and a processor coupled to the tangible memory and the integrated MEMS device. The processor is programmed to perform a plurality of functions by the plurality of executable instructions. These instructions can include:

executable code that programs the processor to read a device ID from the device ID register;
executable code that programs the processor to determine whether the device ID of the integrated MEMS device is valid;
executable code that programs the processor to determine a random value;
executable code that programs the processor to write the random value to the security register;
executable code that programs the processor to determine a configuration value;
executable code that programs the processor to write the configuration value to the security configuration register;
executable code that programs the logic module to determine an operation result via a logic operation using the random value and the configuration value;
executable code that programs the processor to write the operation result to the security register;
executable code that programs the processor to determine a validation result using the logic operation;
executable code that programs the processor to read the operation result from the security register; and
executable code that programs the processor to determine whether the integrated MEMS device is valid using the validation result and the operation result.

An embodiment of the present invention provides a method for implementing a security mechanism in an integrated MEMS (Micro-Electro-Mechanical-System) device having a MEMS sensor with an output register associated with a sensing operation, the integrated MEMS device being electrically coupled to a computing system programmed to perform the method. The method includes, in normal operation, reading from the output register an output of the sensing operation, and in a test mode, determining, by a processor disposed within the computing system, a random value. Determining the random value can include reading from the output register, which in the test mode or provides a value from an internal pattern generator. The method also includes determining, by the processor, a validation value, reading, by the processor, the random value stored in the output register; and determining, by the processor, whether the integrated device is valid using the validation value and the random value stored in the output register.

In an embodiment, the above method also includes reading, by the processor, a device ID from a device ID register disposed within the integrated device, and determining, by the processor, whether the device ID of the integrated device is valid.

In an embodiment, the above method also includes one or more of the following steps:

enabling, by a test module disposed within the integrated device, a test x-out process, wherein determining the random value comprises determining a random x-value and writing the random value to an out register comprises writing the random x-value to an x-out register;
enabling, by a test module disposed within the integrated device, a test y-out process, wherein determining the random value comprises determining a random y-value and writing the random value to an out register comprises writing the random y-value to a y-out register; and
enabling, by a test module disposed within the integrated device, a test z-out process, wherein determining the random value comprises determining a random z-value and writing the random value to an out register comprises writing the random z-value to an z-out register.

In an embodiment, the above method also includes determining, by the processor, a configuration value; and performing the following steps m times, where m is an integer greater than 1; determining, by a logic module disposed within the integrated device, an operation result via a logic operation using a value stored in the output register and the configuration value, wherein the value stored in the output register on the first iteration of the steps performed m times is the random value and the value stored in the output register on each subsequent iteration of the steps performed m times is the operation result of the previous iteration of the steps performed m times; and writing, by the processor, the operation result to the out register. In a specific embodiment, the random value comprises an 8-bit random value. In an embodiment, the logic operation comprises a linear transformation from 8-bit to 16-bit space through a Raw Bypass Mode (RBM) operation, the RBM operation returning an RBM value.

In an embodiment, determining the random value includes, in the test mode, determining random x, y, and z values respectively; writing the random x, y, and z values to X, Y, and Z output registers, respectively; and using X, Y, and Z output registers and making combinations of the values obtained.

In another embodiment, the method also includes determining, by the processor, a validation result using the logic operation; reading, by the processor, the operation result from the out register; and determining, by the processor, whether the integrated device is valid using the validation result and the operation result.

In another embodiment, the method also includes providing an input from the output register to the internal pattern generator related to a duty cycle of the internal pattern generator.

In another embodiment, the method also includes determining, by the processor, a configuration value; and determining, by a logic module disposed within the integrated device, an operation result via a logic operation using the random value stored in the out register, wherein the logic operation comprises a linear feedback shift register (LSFR) operation, the LSFR operation being performed k times where k is an integer greater than or equal to 1; reading, by the processor, the operation result, wherein reading the operation result from the security register comprises reading the operation result from the security register after waiting k clock cycles; and writing, by the processor, the operation result to the out register.

Another embodiment of the present invention provides a method for implementing a security mechanism in an integrated MEMS (Micro-Electro-Mechanical-System) device having a MEMS sensor with an output register associated with a sensing operation, the integrated MEMS device being electrically coupled to a computing system programmed to perform the method. The method includes, in normal operation, reading from the output register an output of the sensing operation; and, in a test mode, determining, by a processor disposed within the computing system, a random value, wherein determining the random value includes reading from the output register, which in the test mode provides a value from a MEMS process or provides a value from an internal pattern generator or logic module. The method also includes determining, by the processor, a validation value; reading, by the processor, the random value stored in the output register; and determining, by the processor, whether the integrated device is valid using the validation value and the random value stored in the output register.

In an embodiment, the above method also includes reading, by the processor, a device ID from a device ID register disposed within the integrated device, and determining, by the processor, whether the device ID of the integrated device is valid.

In an embodiment, the above method also includes one or more of the following steps:
enabling, by a test module disposed within the integrated device, a test x-out process, wherein determining the random value comprises determining a random x-value and writing the random value to an out register comprises writing the random x-value to an x-out register;
enabling, by a test module disposed within the integrated device, a test y-out process, wherein determining the random value comprises determining a random y-value and writing the random value to an out register comprises writing the random y-value to a y-out register; and
enabling, by a test module disposed within the integrated device, a test z-out process, wherein determining the random value comprises determining a random z-value and writing the random value to an out register comprises writing the random z-value to an z-out register.

In an embodiment, the above method also includes, in the test mode, providing an analog or digital test x-out value as output of MEMS self test electrode acting on x axis; providing an analog or digital test y-out value as output of MEMS self test electrode acting on y axis; and providing an analog or digital test z-out as output of MEMS self test electrode acting on z axis.

Another embodiment of the present invention provides a method for implementing a security mechanism in an integrated MEMS (Micro-Electro-Mechanical-Systems) device including, the integrated a MEMS device configured with a MEMS sensor, a MEMS test module, and an internal pattern generator, the integrated MEMS device being further configured with an output register associated with a corresponding sensing operation, wherein, in a test mode, the output register is configured to receive a value from the internal pattern generator or internal logic, the integrated MEMS device being electrically coupled to a computing system or processor programmed to perform the method. The method includes reading, by a processor disposed within the computing system, a device ID from a device ID register disposed within the integrated MEMS device; determining, by the processor, whether the device ID of the integrated MEMS device is valid. The method includes determining, by the a processor disposed within the computing system, a random value, wherein determining the random value includes enabling, by the MEMS test module a MEMS test process to determine the random value or by setting a value associated with a duty cycle of the internal pattern generator in the output register and then reading from the output register to obtain the a value from the internal pattern generator or a time stamp mechanism used by processor. The method further includes writing, by the processor, the random value to a security register disposed within the integrated device; determining, by the processor, a configuration value; writing, by the processor, the configuration value to a security configuration register disposed within the integrated device. The method also includes determining, by a logic module disposed within the integrated device, an operation result via a logic operation using the random value and the configuration value; and writing, by the processor, the operation result to the security register. The method further includes independently determining, by the processor, a validation result using the same logic operation as performed by the MEMS device; reading, by the processor, the operation result from the security register; and determining, by the processor, whether the integrated MEMS device is valid using the device ID, the validation result, and the result from operation independently performed by the processor.

In an embodiment, the integrated MEMS device is configured to, based on device validation, recognize by the processor or software that the MEMS sensor device should enable or disable certain functions or features within the device.

In an embodiment, the integrated MEMS device is configured to provide a plurality of sensor output resolutions, including resolutions of 8-bit, 10-bit, and 14-bit.

In an embodiment, wherein the integrated MEMS device is configured with analog or digital signal processing functions activated within the MEMS sensor and subsystems within the integrated MEMS device, wherein the signal processing functions include filtering, post processing, and event detection.

In an embodiment, wherein the integrated MEMS device is configured with hardware operations enabled or disabled by the MEMS sensor device or the processor.

In an embodiment, wherein the integrated MEMS device is configured with software operations enabled or disabled by the MEMS sensor device or the processor.

Another embodiment of the invention provides a method for implementing a security mechanism in an integrated MEMS (Micro-Electro-Mechanical-Systems) device including, the integrated MEMS device configured with a MEMS sensor, a MEMS test module, and an internal pattern generator, the integrated MEMS device being further configured with an output register associated with a corresponding sensing operation, wherein, in a test mode, the output register is configured to receive a value from the internal pattern generator or internal logic, the integrated MEMS device being electrically coupled to a computing system or processor programmed to perform the method. The method includes, reading, by a processor disposed within the computing system, a device ID from a device ID register disposed within the integrated MEMS device; and, determining, by the processor, whether the device ID of the integrated MEMS device is valid. The method also includes determining, by the processor, a random value, wherein determining the random value includes enabling, by the MEMS test module, a MEMS process to determine the random value or by setting a value associated with a duty cycle of the internal pattern generator in the output register and then reading from the output register to obtain the value from the internal pattern generator or a time stamp mechanism used by processor. The method also includes writing, by the processor, the random value to a security register disposed within the integrated device; determining, by the processor, a configuration value; writing, by the processor, the configuration value to a security configuration register disposed within the integrated device. The method also includes determining, by a logic module disposed within the integrated device, an operation result via a logic operation using the random value and the configuration value; writing the operation result to the security register; independently determining, by the processor, a validation result using the same logic operation as performed by the MEMS device; reading, by the processor, the operation result from the security register; and determining, by the processor, whether the integrated MEMS device is valid using the device ID, the validation result, and the result from operation independently performed by the processor.

In an embodiment, the MEMS process includes a MEMS test process wherein a self test electrode electrostatically activates the MEMS sensor to produce a test value.

In an embodiment the security configuration register includes the device ID register.

In an embodiment, the logic module includes a XOR logic module coupled to the security register and the logic operation comprises an XOR operation.

In an embodiment, the logic module includes a linear feedback shift register (LFSR) module coupled to the security register.

In an embodiment, the logic operation includes a linear feedback shift register (LSFR) operation, the LFSR operation being performed k times where k is an integer greater than or equal to 1; and wherein reading the operation result from the security register comprises reading the operation result from the security register after waiting k clock cycles.

In an embodiment, the configuration value includes a polynomial.

Figure 5:
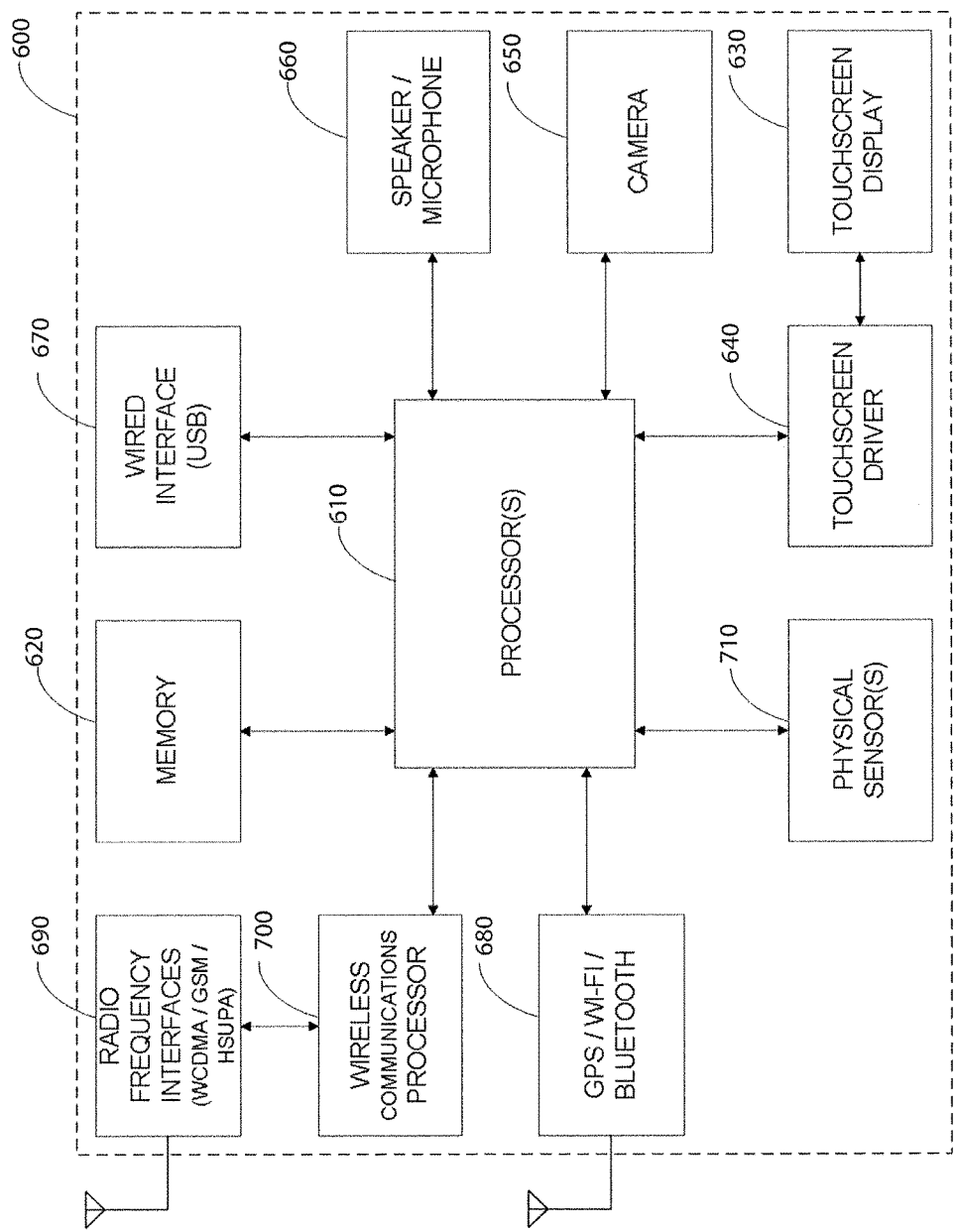
FIG. 5 illustrates a simplified functional block diagram of various embodiments of the present invention.

FIG. 5 illustrates a functional block diagram of various embodiments of the present invention. In FIG. 5, a computing device 600 typically includes an applications processor 610, memory 620, a touch screen display 630 and driver 640, an image acquisition device 650, audio input/output devices 660, and the like. Additional communications from and to computing device are typically provided by via a wired interface 670, a GPS/Wi-Fi/Bluetooth interface 680, RF interfaces 690 and driver 700, and the like. Also included in various embodiments are physical sensors 710.

In various embodiments, computing device 600 may be a hand-held computing device (e.g. Apple iPad, Apple iTouch, Dell Mini slate, Lenovo Skylight/IdeaPad, Asus EEE series, Microsoft Courier, Notion Ink Adam), a portable telephone (e.g. Apple iPhone, Motorola Droid, Google Nexus One, HTC Incredible/EVO 4G, Palm Pre series, Nokia N900), a portable computer (e.g. netbook, laptop), a media player (e.g. Microsoft Zune, Apple iPod), a reading device (e.g. Amazon Kindle, Barnes and Noble Nook), or the like.

Typically, computing device 600 may include one or more processors 610. Such processors 610 may also be termed application processors, and may include a processor core, a video/graphics core, and other cores. Processors 610 may be a processor from Apple (A4), Intel (Atom), NVidia (Tegra 2), Marvell (Armada), Qualcomm (Snapdragon), Samsung, TI (OMAP), or the like. In various embodiments, the processor core may be an Intel processor, an ARM Holdings processor such as the Cortex-A, -M, -R or ARM series processors, or the like. Further, in various embodiments, the video/graphics core may be an Imagination Technologies processor PowerVR -SGX, -MBX, -VGX graphics, an Nvidia graphics processor (e.g. GeForce), or the like. Other processing capability may include audio processors, interface controllers, and the like. It is contemplated that other existing and/or later-developed processors may be used in various embodiments of the present invention.

In various embodiments, memory 620 may include different types of memory (including memory controllers), such as flash memory (e.g. NOR, NAND), pseudo SRAM, DDR SDRAM, or the like. Memory 620 may be fixed within computing device 600 or removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), application data, operating system data or the like. It is contemplated that other existing and/or later-developed memory and memory technology may be used in various embodiments of the present invention.

In various embodiments, touch screen display 630 and driver 640 may be based upon a variety of later-developed or current touch screen technology including resistive displays, capacitive displays, optical sensor displays, electromagnetic resonance, or the like. Additionally, touch screen display 630 may include single touch or multiple-touch sensing capability. Any later-developed or conventional output display technology may be used for the output display, such as TFT-LCD, OLED, Plasma, trans-reflective (Pixel Qi), electronic ink (e.g. electrophoretic, electrowetting, interferometric modulating). In various embodiments, the resolution of such displays and the resolution of such touch sensors may be set based upon engineering or non-engineering factors (e.g. sales, marketing). In some embodiments of the present invention, a display output port, such as an HDMI-based port or DVI-based port may also be included.

In some embodiments of the present invention, image capture device 650 may include a sensor, driver, lens and the like. The sensor may be based upon any later-developed or convention sensor technology, such as CMOS, CCD, or the like. In various embodiments of the present invention, image recognition software programs are provided to process the image data. For example, such software may provide functionality such as: facial recognition, head tracking, camera parameter control, or the like.

In various embodiments, audio input/output 660 may include conventional microphone(s)/speakers. In some embodiments of the present invention, three-wire or four-wire audio connector ports are included to enable the user to use an external audio device such as external speakers, headphones or combination headphone/microphones. In various embodiments, voice processing and/or recognition software may be provided to applications processor 610 to enable the user to operate computing device 600 by stating voice commands. Additionally, a speech engine may be provided in various embodiments to enable computing device 600 to provide audio status messages, audio response messages, or the like.

In various embodiments, wired interface 670 may be used to provide data transfers between computing device 600 and an external source, such as a computer, a remote server, a storage network, another computing device 600, or the like. Such data may include application data, operating system data, firmware, or the like. Embodiments may include any later-developed or conventional physical interface/protocol, such as: USB 2.0, 3.0, micro USB, mini USB, Firewire, Apple iPod connector, Ethernet, POTS, or the like. Additionally, software that enables communications over such networks is typically provided.

In various embodiments, a wireless interface 680 may also be provided to provide wireless data transfers between computing device 600 and external sources, such as computers, storage networks, headphones, microphones, cameras, or the like. As illustrated in FIG. 5, wireless protocols may include Wi-Fi (e.g. IEEE 802.11 a/b/g/n, WiMax), Bluetooth, IR and the like.

GPS receiving capability may also be included in various embodiments of the present invention, however is not required. As illustrated in FIG. 5, GPS functionality is included as part of wireless interface 180 merely for sake of convenience, although in implementation, such functionality is currently performed by circuitry that is distinct from the Wi-Fi circuitry and distinct from the Bluetooth circuitry.

Additional wireless communications may be provided via RF interfaces 690 and drivers 700 in various embodiments. In various embodiments, RF interfaces 690 may support any future-developed or conventional radio frequency communications protocol, such as CDMA-based protocols (e.g. WCDMA), GSM-based protocols, HSUPA-based protocols, or the like. In the embodiments illustrated, driver 700 is illustrated as being distinct from applications processor 610. However, in some embodiments, these functionality are provided upon a single IC package, for example the Marvel PXA330 processor, and the like. It is contemplated that some embodiments of computing device 600 need not include the RF functionality provided by RF interface 690 and driver 700.

FIG. 5 also illustrates computing device 600 to include physical sensors 710. In various embodiments of the present invention, physical sensors 710 can be single axis or multi-axis Micro-Electro-Mechanical Systems (MEMS) based devices being developed by M-cube, the assignee of the present patent application. Physical sensors 710 can include accelerometers, gyroscopes, pressure sensors, magnetic field sensors, bio sensors, and the like. In other embodiments of the present invention, conventional physical sensors 710 from Bosch, STMicroelectronics, Analog Devices, Kionix or the like may be used.

In various embodiments, any number of future developed or current operating systems may be supported, such as iPhone OS (e.g. iOS), WindowsMobile (e.g. 7), Google Android (e.g. 2.2), Symbian, or the like. In various embodiments of the present invention, the operating system may be a multi-threaded multi-tasking operating system. Accordingly, inputs and/or outputs from and to touch screen display 630 and driver 640 and inputs/or outputs to physical sensors 710 may be processed in parallel processing threads. In other embodiments, such events or outputs may be processed serially, or the like. Inputs and outputs from other functional blocks may also be processed in parallel or serially, in other embodiments of the present invention, such as image acquisition device 650 and physical sensors 710.

FIG. 5 is representative of one computing or micro-processing device 600 capable of embodying the present invention. In one embodiment, the DOC can be implanted on chip with sensors instead of using an external processor. The previously described methods of operation can be implemented with on-chip logic or through a micro-processor in the same device or in a separate chip within the hand-held device. It will be readily apparent to one of ordinary skill in the art that many other hardware and software configurations are suitable for use with the present invention. Embodiments of the present invention may include at least some but need not include all of the functional blocks illustrated in FIG. 5. For example, in various embodiments, computing device 600 may lack image acquisition unit 650, or RF interface 690 and/or driver 700, or GPS capability, or the like. Additional functions may also be added to various embodiments of computing device 600, such as a physical keyboard, an additional image acquisition device, a trackball or trackpad, a joystick, or the like. Further, it should be understood that multiple functional blocks may be embodied into a single physical package or device, and various functional blocks may be divided and be performed among separate physical packages or devices.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for implementing a security mechanism in an integrated MEMS (Micro-Electro-Mechanical-System) device having a MEMS sensor with an output register associated with a sensing operation, the integrated MEMS device being electrically coupled to a computing system programmed to perform the method, the method comprising:
   in normal operation, reading from the output register an output of the sensing operation;
   in a test mode, determining, by a processor disposed within the computing system, a random value, wherein determining the random value includes reading from the output register, which, in the test mode, provides a value from an internal pattern generator;
   determining, by the processor, a validation value;
   reading, by the processor, the random value stored in the output register; and
   determining, by the processor, whether the integrated MEMS device is valid using the validation value and the random value stored in the output register.

2. The method of claim 1, further comprising:
   reading, by the processor, a device ID from a device ID register disposed within the integrated MEMS device; and
   determining, by the processor, whether the device ID of the integrated MEMS device is valid.

3. The method of claim 1, further comprising one or more of the following steps:

enabling, by a test module disposed within the integrated MEMS device, a test x-out process, wherein determining the random value comprises determining a random x-value and writing the random value to an out register comprises writing the random x-value to an x-out register;

enabling, by a test module disposed within the integrated MEMS device, a test g-out process, wherein determining the random value comprises determining a random y-value and writing the random value to an out register comprises writing the random y-value to a y-out register; and enabling, by a test module disposed within the integrated MEMS device, a test t-out process, wherein determining the random value comprises determining a random z-value and writing the random value to an out register comprises writing the random z-value to an z-out register.

4. The method of claim 1, further comprising:
determining, by the processor, a configuration value; and performing the following steps m times, where m is an integer greater than 1:
determining, by a logic module disposed within the integrated MEMS device, an operation result via a logic operation using a value stored in the output register and the configuration value, wherein the value stored in the output register on the first iteration of the steps performed m times is the random value and the value stored in the output register on each subsequent iteration of the steps performed m times is the operation result of the previous iteration of the steps performed m times; and
writing, by the processor, the operation result to the out register.

5. The method of claim 4, wherein the random value comprises an 8-bit random value.

6. The method of claim 5, wherein the logic operation comprises a linear transformation from 8-bit to 16-bit space through a Raw Bypass Mode (RBM) operation, the RBM operation returning an RBM value.

7. The method of claim 1, wherein determining the random value comprises, in the test mode:
determining random x, y, and z values respectively;
writing the random x, y, and z values to X, Y, and Z output registers, respectively;
using the X, Y, and Z output registers and making combinations of the x, y, and z values.

8. The method of claim 1, further comprising:
determining, by the processor, a validation result using a logic operation;
reading, by the processor, the operation result from the output register; and
determining, by the processor, whether the integrated MEMS device is valid using the validation result and the operation result.

9. The method of claim 1, further comprising providing an input from the output register to the internal pattern generator related to a duty cycle of the internal pattern generator.

10. The method of claim 1, further comprising:
determining, by the processor, a configuration value;
determining, by a logic module disposed within the integrated MEMS device, an operation result via a logic operation using the random value stored in the out register, wherein the logic operation comprises a linear feedback shift register (LSFR) operation, the LSFR operation being performed k times where k is an integer greater than or equal to 1;

reading, by the processor, the operation result, wherein reading the operation result comprises reading the operation result from a security register after waiting k clock cycles; and
writing, by the processor, the operation result to the output register.

11. A method for implementing a security mechanism in an integrated MEMS (Micro-Electro-Mechanical-System) device having a MEMS sensor with an output register associated with a sensing operation, the integrated MEMS device being electrically coupled to a computing system programmed to perform the method, the method comprising:
in normal operation, reading from the output register an output of the sensing operation;
in a test mode, determining, by a processor disposed within the computing system, a random value, wherein determining the random value includes reading from the output register, which in the test mode provides a value from a MEMS process or provides a value from an internal pattern generator or logic module;
determining, by the processor, a validation value;
reading, by the processor, the random value stored in the output register; and
determining, by the processor, whether the integrated MEMS device is valid using the validation value and the random value stored in the output register.

12. The method of claim 11, further comprising:
reading, by the processor, a device ID from a device ID register disposed within the integrated MEMS device; and
determining, by the processor, whether the device ID of the integrated MEMS device is valid.

13. The method of claim 11, further comprising one or more of the following steps:
enabling, by a test module disposed within the integrated MEMS device, a test x-out process, wherein determining the random value comprises determining a random x-value and writing the random value to an out register comprises writing the random x-value to an x-out register;
enabling, by a test module disposed within the integrated MEMS device, a test g-out process, wherein determining the random value comprises determining a random y-value and writing the random value to an out register comprises writing the random y-value to a y-out register; and
enabling, by a test module disposed within the integrated MEMS device, a test t-out process, wherein determining the random value comprises determining a random z-value and writing the random value to an out register comprises writing the random z-value to an z-out register.

14. The method of claim 13, further comprising, in the test mode,
providing an analog or digital test x-out value as output of MEMS self test electrode acting on x axis;
providing an analog or digital test y-out value as output of MEMS self test electrode acting on y axis; and
providing an analog or digital test z-out as output of MEMS self test electrode acting on z axis.

15. A method for implementing a security mechanism in an integrated MEMS (Micro-Electro-Mechanical-Systems) device including, the integrated MEMS device configured with a MEMS sensor, a MEMS test module, and an internal pattern generator, the integrated MEMS device being further configured with an output register associated with a corresponding sensing operation, wherein, in a test mode, the output register is configured to receive a value from the internal pattern generator or internal logic, the integrated MEMS device being electrically coupled to a computing system or processor programmed to perform the method, the method comprising:

reading, by a processor disposed within the computing system, a device ID from a device ID register disposed within the integrated MEMS device;

determining, by the processor, whether the device ID of the integrated MEMS device is valid;

determining, by the processor disposed within the computing system, a random value, wherein determining the random value includes enabling, by the MEMS test module a MEMS test process to determine the random value or by setting a value associated with a duty cycle of the internal pattern generator in the output register and then reading from the output register to obtain the value from the internal pattern generator or a time stamp mechanism used by the processor;

writing, by the processor, the random value to a security register disposed within the integrated MEMS device;

determining, by the processor, a configuration value;

writing, by the processor, the configuration value to a security configuration register disposed within the integrated MEMS device;

determining, by a logic module disposed within the integrated MEMS device, an operation result via a logic operation using the random value and the configuration value;

writing, by the processor, the operation result to the security register;

independently determining, by the processor, a validation result using the same logic operation as performed by the integrated MEMS device;

reading, by the processor, the operation result from the security register; and determining, by the processor, whether the integrated MEMS device is valid using the device ID, the validation result, and results from the independently determining performed by the processor.

16. The method of claim 15, wherein the integrated MEMS device is configured to, based on device validation, recognize by the processor or software that the integrated MEMS device should enable or disable certain functions or features within the integrated MEMS device.

17. The method of claim 15, wherein the integrated MEMS device is configured to provide a plurality of sensor output resolutions, including resolutions of 8-bit, 10-bit, and 14-bit.

18. The method of claim 15, wherein the integrated MEMS device is configured with analog or digital signal processing functions activated within the MEMS sensor and subsystems within the integrated MEMS device, wherein the signal processing functions include filtering, post processing, and event detection.

19. The method of claim 15, wherein the integrated MEMS device is configured with hardware operations enabled or disabled by the integrated MEMS device or the processor.

20. The method of claim 15, wherein the integrated MEMS device is configured with software operations enabled or disabled by the integrated MEMS device or the processor.

21. A method for implementing a security mechanism in an integrated MEMS (Micro-Electro-Mechanical-Systems) device including, the integrated MEMS device configured with a MEMS sensor, a MEMS test module, and an internal pattern generator, the integrated MEMS device being further configured with an output register associated with a corresponding sensing operation, wherein, in a test mode, the output register is configured to receive a value from the internal pattern generator or internal logic, the integrated MEMS device being electrically coupled to a computing system or processor programmed to perform the method, the method comprising:

reading, by a processor disposed within the computing system, a device ID from a device ID register disposed within the integrated MEMS device;

determining, by the processor, whether the device ID of the integrated MEMS device is valid;

determining, by the processor, a random value, wherein determining the random value includes enabling, by the MEMS test module, a MEMS process to determine the random value or by setting a value associated with a duty cycle of the internal pattern generator in the output register and then reading from the output register to obtain the value from the internal pattern generator or a time stamp mechanism used by the processor;

writing, by the processor, the random value to a security register disposed within the integrated MEMS device;

determining, by the processor, a configuration value;

writing, by the processor, the configuration value to a security configuration register disposed within the integrated MEMS device;

determining, by a logic module disposed within the integrated MEMS device, an operation result via a logic operation using the random value and the configuration value;

writing the operation result to the security register;

independently determining, by the processor, a validation result using the same logic operation as performed by the integrated MEMS device;

reading, by the processor, the operation result from the security register; and determining, by the processor, whether the integrated MEMS device is valid using the device ID, the validation result, and results from the independently determining performed by the processor.

22. The method of claim 21, wherein the MEMS process comprises a MEMS test process wherein a self test electrode electrostatically activates the MEMS sensor to produce a test value.

23. The method of claim 21, wherein the security configuration register comprises the device ID register.

24. The method of claim 23, wherein the logic module comprises a XOR logic module coupled to the security register and the logic operation comprises an XOR operation.

25. The method of claim 21, wherein the logic module comprises a linear feedback shift register (LFSR) module coupled to the security register.

26. The method of claim 25, wherein the logic operation comprises a linear feedback shift register (LSFR) operation, the LFSR operation being performed k times where k is an integer greater than or equal to 1; and wherein reading the operation result from the security register comprises reading the operation result from the security register after waiting k clock cycles.

27. The method of claim 25, wherein the configuration value comprises a polynomial.

* * * * *

UNITED STATES PATENT AND TRADEMARK OFFICE
CERTIFICATE OF CORRECTION

PATENT NO. : 10,078,112 B2  
APPLICATION NO. : 15/236182  
DATED : September 18, 2018  
INVENTOR(S) : Sanjay Bhandari and Tony Maraldo Page 1 of 1

It is certified that error appears in the above-identified patent and that said Letters Patent is hereby corrected as shown below:

In the Claims

In Claim 3, Column 15, Line 8, replace "g-out" with -- y-out --.

In Claim 3, Column 15, Line 14, replace "t-out" with -- z-out --.

In Claim 13, Column 16, Line 42, replace "g-out" with -- y-out --.

In Claim 13, Column 16, Line 48, replace "t-out" with -- z-out --.

Signed and Sealed this  
Sixth Day of November, 2018

Andrei Iancu  
*Director of the United States Patent and Trademark Office*